United States Patent
Wada et al.

[15] 3,671,480
[45] June 20, 1972

[54] HEAT-CURABLE ELASTOMERIC SILICONE COMPOSITIONS

[72] Inventors: Tadashi Wada; Kunio Itoh, both of Annaka-shi, Japan

[73] Assignee: Shinetsu Chemical Company, Tokyo, Japan

[22] Filed: Dec. 18, 1969

[21] Appl. No.: 886,372

[30] Foreign Application Priority Data

Dec. 23, 1968 Japan.....................................43/94385

[52] U.S. Cl. ..................................260/29.1 SB, 260/37 SB
[51] Int. Cl..............................................................C08g 51/04
[58] Field of Search..............260/37 SB, 46.5 U, 825, 29.1 G

[56] References Cited

UNITED STATES PATENTS

| | | | |
|---|---|---|---|
| 3,159,601 | 12/1964 | Ashby | 260/46.5 |
| 3,220,972 | 11/1965 | Lamoreaux | 260/46.5 |
| 3,284,406 | 11/1966 | Nelson | 260/46.5 |
| 3,341,490 | 9/1967 | Burdick et al. | 260/37 SB |
| 3,436,366 | 4/1969 | Modic | 260/37 SB |

*Primary Examiner*—Lewis T. Jacobs
*Attorney*—McGlew and Toren

[57] ABSTRACT

A heat curable elastomeric silicone composition comprising a mixture of two polydiorganosiloxanes, each of which contains vinyl unsaturation; a silica filler; a polyorganohydrogensiloxane and a platinum compound; and a method for the preparation of vulcanizates thereof. The composition is cured for a period up to about one hour and is then post-cured for up to about 24 hours to yield a vulcanized elastomer having high tear strength, flame retardance, heat resistance and superior compression set.

8 Claims, No Drawings

HEAT-CURABLE ELASTOMERIC SILICONE COMPOSITIONS

BACKGROUND OF THE INVENTION

This invention relates to novel elastomeric silicone compositions, and particularly to heat-curable elastomeric silicone compositions possessing greatly improved tear strength.

Prior art silicone rubbers have been prepared by curing with a peroxide such as benzoyl peroxide, tertiary butyl peroxide, dichlorobenzoyl peroxide and tertiary butyl perbenzoate, compositions consisting of 1. polydiorganosiloxane gum in which the organic groups are mostly methyl groups with a small number of vinyl groups,
2. siloxane ester of low molecular weight or silanol, and
3. a filler.

As these vulcanizates are superior in electrical properties and thermal and weather resistances, they are used in various applications, but they have a big disadvantage in that they have poorer tear strengths than synthetic rubbers other than silicone rubbers. Various attempts have been made to overcome this disadvantage. In one case, some of the organic groups in the above-described polydiorganosiloxane gum were replaced by phenyl groups which served to improve the tear strength of the product to some extent, but which caused the elasticity to be reduced in addition to causing a remarkable degradation of the compression set and the oil resistance thereof. In another case, although the silica filler employed for the purpose of reinforcing had a surface area of at least 300 m$^2$/g, the tear strength of the product proved to be no more than 20 kg/cm. Thus the problem of how to prepare silicone rubbers having higher tear strengths has not before now been solved.

SUMMARY OF THE INVENTION

Accordingly, it is an object of this invention to provide heat-curable elastomeric silicone compositions which have high tear strengths.

Another object of this invention is to provide heat-curable elastomeric silicone compositions which, when cured, give silicone rubbers which are superior in compression set, heat and steam resistances and which are self-extinguishing in addition to having improved confined heat resistance, and which contain therein no decomposed residue of the curing agent.

Yet another object of this invention is to provide heat curable elastomeric silicone compositions which are useful as wire-insulating materials, sealing materials, and packing materials.

Still another object of this invention is to provide a process for obtaining vulcanizates of the above elastomeric compositions.

The compositions of the invention comprise:

a. from about 70 to about 99.5 parts by weight of a polydiorganosiloxane containing from about 0.02 to about 0.2 mole percent of vinyl group-containing siloxane units and which is represented by the general formula:
$R_3SiO(R_2SiO)_mSiR_3$
wherein R is the same or different monovalent hydrocarbyl group, either substituted or unsubstituted, and $m$ is at least 3,000;

b. from about 0.5 to about 30 parts by weight of a polydiorganosiloxane containing at least about 2 mole percent of vinyl group-containing siloxane units and which is represented by the general formula:
$R'_3SiO(R'_2SiO)_nSiR'_3$
where R' is the same or different monovalent hydrocarbyl group, either substituted or unsubstituted, and $n$ is at least 100;

c. from about 20 to about 200 parts by weight of a silica filler having a surface area of at least 150 m$^2$/g;

d. a polyorganohydrogensiloxane in an amount such that its Si-H groups are from about 80 to about 250 mole percent relative to the total vinyl groups contained in the above components (a) and (b), and which have at least 3 Si-H groups in each molecule; and e. a platinum compound.

The above composition is cured for a period up to about one hour and is then post-cured for up to about 24 hours to yield a vulcanized elastomer having high tear strengths, flame retardance, heat resistance, and superior compression set.

DESCRIPTION OF THE PREFERRED EMBODIMENTS

The present invention has been made through our observations that when polyorganosiloxane compositions formed of silicone rubbers consisting of the above components (a) and (b) are heated either under atmospheric pressure or high pressure in the presence of a curing agent of polyorganohydrogensiloxane, and a platinum compound, silicone rubber vulcanizates with an unexpectedly high tear strength can be prepared.

To give a more detailed description of the components employed in practicing the instant invention, polydiorganosiloxane employed as component (a), is represented by the formula:

$R_3SiO(R_2SiO)_mSiR_3$ where R is the same or different monovalent hydrocarbyl group, either substituted or unsubstituted, for example, vinyl, methyl, ethyl, trifluoropropyl, or phenyl group. Said polydiorganosiloxane is obtained by polymerization in the presence of an alkaline catalyst, for example, a mixture of octamethyl tetracyclosiloxane and tetramethyl tetravinyl cyclosiloxane, and, if desired, octaphenyl tetracylosiloxane or tetramethyl tetraphenyl cyclosiloxane. This is the principal component of the silicone elastomeric composition, so it must have a degree of polymerization of at least 3,000 in order to prevent the reduction of the tear strength of the silicone rubber vulcanizate prepared therefrom.

The polydiorganosiloxane which is employed as compound (b) and which is represented by the general formula:

$R'_3SiO(R'_2SiO)_nSiR'_3$ where R' is the same or different monovalent hydrocarbyl group, either substituted or unsubstituted, for example, vinyl, methyl, ethyl, trifluoropropyl, or phenyl group, is prepared just like component (a), but its degree of polymerization does not have to be as high as compound (a), although it has to be at least 100.

Both components (a) and (b) must contain vinyl groups, but in order to obtain silicone rubber vulcanizates having a high tear strength, the vinyl group-containing siloxane units therein must be from about 0.02 to about 0.2 mole percent in component (a) and at least about 2 mole percent in component (b). The ratio of component (a) to component (b) has to be from about 70 to about 99.5 parts by weight of (a) to from about 0.5 to about 30 parts by weight of (b). If the vinyl group-containing siloxane units in components (a) and (b) and/or the ratio of component (a) to component (b) are not in the ranges given above, the cross-linking reaction with polyorganohydrogensiloxane which is employed as component (d) will not be conducted satisfactorily, failing to give the desired high tear strength to the resultant silicone rubber vulcanizate.

Ordinary silica fillers used for prior art silicone rubbers can be employed as component (c), and can be exemplified by finely divided powders of silica such as fumed silica and silica aerogel. If the particle size of the silica is large, the mechanical strength of the silicone rubber vulcanizate obtained will be reduced, so that the particular size of the silica must be fine enough to have a surface area of at least 150 m$^2$/g as measured by the nitrogen absorption method. The quantity of such silica to be incorporated in the composition is from about 20 to about 200 parts by weight relative to the above quantities of components (a) and (b).

The polyorganohydrogensiloxane which is employed as component (d) must have at least 3 Si-H groups in each molecule and is exemplified by trialkylsilyl end-blocked polymethylhydrogensiloxane of various degrees of polymerization, tetrasiloxane represented by $Si[OSi(CH_3)_2H]_4$, siloxane copolymer consisting of $SiO_2$ units and $(CH_3)_2HSi-O-SiH(CH_3)_2$ units and copolymers of methylhydrogensiloxane and dialkylsiloxane. These may be prepared by the known methods. The cross-linking reaction of component (d) is conducted by the addition reaction between Si-H groups and vinyl groups connected to silicon atoms in the above components (a) and (b), so it is preferable that the organic group directly bonded to the silicon atom connected to a hydrogen atom in component (d) is low in molecular weight, e.g., a methyl group.

If the quantity of component (d) is too small, insufficient cross-linking will occur, but if it is too large, the desired tear strength and the thermal resistance of the product will be reduced. Accordingly, it is desirable that the Si-H groups in component (d) be from about 80 to about 250 mole percent of the total vinyl groups contained in components (a) and (b).

The platinum compound added to the composition as component (e) is employed as a catalyst for the above curing, or addition, reaction, and is preferably a soluble platinum compound such as chloroplatinic acid, or a complex of (1) platinum chloride and (2) an olefine such as ethylene, propylene, butadiene and cyclohexene. The quantity of compound (e) required is from about 0.5 to about 20 ppm based on the total weight of the above-mentioned components (a), (b) and (d).

The heat curable elastomeric silicone compositions of this invention are prepared by kneading the mixtures of the above components (a), (b), (c), (d), and (e) by means of a two-roll rubber mill or a Banbury mixer together with a dispersing agent such as a siloxane ester of low molecular weight or silanol, e.g., diphenylsilanediol, a heat-resistance improving agent such as ferrous oxide, cerium oxide, or ferrous octoate, and pigments. In order to further improve the stability in storage of the products, organic phosphorus compounds or organic amines known to the art may be added. There is no particular order in which the above components need to be mixed, but usually components (a), (b), and (c) are homogenously mixed first, and then to this mixture are added components (d) and (e).

The compositions of the present invention are heated at a temperature between about 100° C and about 400° C, either under atmospheric pressure or high pressure, for a period of from about 30 seconds to about 1 hour, and then, if desired, at a temperature between about 150° C and about 250° C for a period of from about 2 to about 24 hours to accomplish post-curing, thereby obtaining elastomer vulcanizates possessing high tear strength. No residue of the curing agents remains in the finished products unlike the case of ordinary silicone rubbers for which peroxides are usually used as curing agents, so that silicone rubber vulcanizates thus prepared are superior in compression set, heat and steam resistances, and flame retardance as well as confined heat resistance. Consequently, they are very useful as wire-insulating materials, sealing materials, and packing materials especially in such places where high tear strengths are required.

The details of the invention will be further described in the following examples in which all parts and percents are by weight.

EXAMPLE I

Trimethylsilyl end-blocked polydiorganosiloxane (component a) having a degree of polymerization of about 8,000 and consisting of about 99.85 mole percent of dimethylsiloxy units and 0.15 mole percent of methyl vinyl siloxy units; trimethylsilyl end-blocked polydiorganosiloxane (component b[I]) having a degree of polymerization of about 5,000 and consisting of 97 mole percent of dimethylsiloxy units and 3 mole percent of methyl vinyl siloxy units or trimethylsilyl end-blocked polydiorganosiloxane (component b[II]) having a degree of polymerization of about 8,000 and consisting of 99 mole percent of dimethylsiloxy units and 1 mole percent of methyl vinyl siloxy units; fumed silica (component c) having a surface area of 200 m$^2$/g; and polymethylhydrogensiloxane (component d) containing

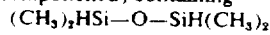
$(CH_3)_2HSi-O-SiH(CH_3)_2$ units and $SiO_2$ units in the ratio of 2 moles to 1 mole; and chloroplatinic acid (component e) were compounded in the ratios given in the following table. First, components (a), (b), and (c) were kneaded on a two-roll rubber mill together with 5 parts of diphenylsilanediol, and after each kneaded composition was heated at 150° C for 1 hour, components (d) and (e) were added. The mixtures were pressed at 170° C under a pressure of 30 kg/cm$^2$ for 10 minutes into a 2 mm thick sheet. When these sheets were subjected to post-cure heating at 200° C for 4 hours, their elastomeric properties were as shown in the table. The figures in the parentheses are the values obtained of sample sheets that had not been subjected to post-cure heating at 200° C for 4 hours.

TABLE

|  | Example 1 | Control 1 | Control 2 |
|---|---|---|---|
| Component (a) (parts) | 90 | 65 | 99 |
| Component (b) (kind) | (I) | (I) | (II) |
| (parts) | 10 | 35 | 1 |
| Component (c) (parts) | 40 | 40 | 40 |
| Component (d) (parts) | 0.73 | 1.49 | 0.73 |
| Component (e) (ppm) | 14.5 | 14.5 | 14.5 |
| Hardness (JIS C-2123) | 55 (50) | 72 | 54 |
| Elongation (%) | 520 (600) | 330 | 470 |
| Tensile strength (kg/cm$^2$) | 96 (85) | 73 | 100 |
| Tear strength (kg/cm) | 45 (50) | 25 | 26 |

In order to test the heat resistance, two sample sheets of the vulcanizate of Example I which had been post-cured were heated, one at 200° C for 72 hours and the other at 250° C for 24 hours, after which the tear strengths were 33 kg/cm and 29 kg/cm, respectively. The sheet prepared in Control 2, when subjected to heating at 250° C for 24 hours was found to have a tear strength of no more than 18 kg/cm.

EXAMPLE II 70 parts of dimethyl vinyl silyl end-blocked polydiorganosiloxane (component a) having a degree of polymerization of about 6,000 and consisting of 99.9 mole percent of dimethyl siloxy units and 0.10 percent of methyl vinyl siloxy units; 30 parts of dimethyl vinyl silyl end-blocked polydiorganosiloxane (component b) having a degree of polymerization of about 6,000 and consisting of 95 mole percent of dimethyl siloxy units and 5 mole percent of methyl vinyl siloxy units; 40 parts of fumed silica (component c) having a surface area of 380 m$^2$/g; and 7 parts of diphenylsilanediol were compounded on a two-roll rubber mill and heated at 140° C for 3 hours. Subsequently, 2.2 parts of polydihydrogensiloxane (component d) and 7.5 ppm of chloroplatinic acid (component e), as in Example I, were added to the above composition and were uniformly mixed therein. The composition was then pressed at 150° C under a pressure of 50 kg/cm$^2$ for 15 minutes into a 2 mm thick sheet. The sheet was subjected to heating at 200° C for 4 hours to give a vulcanizate having the following elastomeric properties:

| Hardness: | 52 |
|---|---|
| Elongation (%) | 580 |
| Tensile strength (kg/cm$^2$) | 100 |
| Tear strength (kg/cm) | 48 |

Two sample sheets of the above were heated, one at 200° C for 72 hours and the other at 250° C for 24 hours, and their tear strengths were found to be 39 kg/cm and 32 kg/cm, respectively.

EXAMPLE III 99 parts of dimethyl vinyl silyl end-blocked polydiorganosiloxane (component a), having a degree of polymerization of about 8,000 and consisting of about 96.6 mole percent of dimethyl siloxy units, 3.3 mole percent of diphenyl siloxy units and 0.1 mole percent of methyl vinyl siloxy units; 1 part of dimethyl vinyl silyl end-blocked polydiorganosiloxane (component b) having a degree of polymerization of about 1,000 and consisting of 80 mole percent of dimethyl siloxy units and 20 mole percent of methyl vinyl siloxy units; 45 parts of fumed silica (component c) having a surface area of 300 m²/g; and 5 parts of diphenylmethylsilanemonool were compounded on a two-roll rubber mill and heated at 200° C for 2 hours. Subsequently, 1.05 parts of polydihydrogensiloxane (component d) and 15 ppm of chloroplatinic acid (component e), as in Example I, were homogenously dispersed in the above composition which was then pressed into a 2 mm thick sheet. The sheet was cured with hot air (300° C) under atmospheric pressure and then subjected to another curing cycle at 200° C for 2 hours. The product was found to have the following elastomeric properties in addition to a particularly superior flame-extinguishing property:

| | |
|---|---|
| Hardness | 52 |
| Elongation (%) | 620 |
| Tensile strength (kg/cm²) | 103 |
| Tear strength (kg/cm) | 50. |

When two samples of the above sheet were heated at 200° C for 72 hours and at 250° C for 24 hours, respectively, their respective tear strengths were 40 kg/cm and 32 kg/cm, confirming that they had excellent heat resistance.

EXAMPLE IV 99 parts of dimethyl vinyl silyl end-blocked polydiorganosiloxane (component a) having a degree of polymerization of about 10,000 and consisting of 99.85 mole percent of dimethyl siloxy units and 0.15 mole percent of methyl vinyl siloxy units; one part of dimethyl vinyl silyl end-blocked polydiorganosiloxane (component b) having a degree of polymerization of about 200 and consisting of 50 mole percent of dimethyl siloxy units and 50 mole percent of methyl vinyl siloxy units; 50 parts of fumed silica (component c) having a surface area of 300 m²/g; and 5 parts of diphenylsilanediol were compounded on a two-roll rubber mill and heated at 160° C for two hours. Subsequently, to the composition were added 0.6 part of polymethylhydrogensiloxane oil (component d) having the formula:

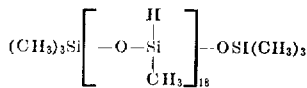

and 29 ppm of chloroplatinic acid (component e) and homogenously dispersed therein on a two-roll rubber mill.

Under the same conditions as in Example II, the composition was pressed into a 2 mm thick sheet and heated at 200° C for 4 hours. The product was found to have the following elastomeric properties:

| | |
|---|---|
| Hardness | 65 |
| Elongation (%) | 410 |
| Tensile strength (kg/cm²) | 80 |
| Tear strength (kg/cm) | 34 |

EXAMPLE V

An experiment similar to the one described in Example IV was conducted in which the only difference was that the quantity of polymethylhydrogensiloxane oil (component d) was 0.3 part instead of 0.6 part. The vulcanizate obtained failed to give sufficient elasticity and strength. When 1.8 parts of polymethylhydrogensiloxane oil (component d) was employed, the vulcanizate had the following result, illustrating that when the quantity of vinyl groups present in the components is excessive, condensation takes place among them, preventing sufficient formation of the cross-linked structure:

| | |
|---|---|
| Hardness | 75 |
| Elongation (%) | 220 |
| Tensile strength (kg/cm²) | 76 |
| Tear strength (kg/cm) | 17 |

While specific embodiments of the invention have been shown and described in detail to illustrate the application of the inventive principles, it will be understood that the invention may be embodied otherwise without departing from such principles.

What is claimed is:

1. A heat-curable elastomeric composition comprising:
   a. from about 70 to about 99.5 parts by weight of a polydiorganosiloxane containing from about 0.02 to about 0.2 mole percent of vinyl group-containing siloxane units and having the general formula $R_3SiO(R_2SiO)_mSiR_3$ wherein R is a monovalent hydrocarbyl group and $m$ is at least about 3,000;
   b. from about 0.5 to about 30 parts by weight of a polydiorganosiloxane containing at least about 2 mole percent of vinyl group-containing siloxane units and having the general formula $R'_3SiO(R'_2SiO)_nSiR'_3$ wherein R' is a monovalent hydrocarbyl group and $n$ is at least about 100;
   c. from about 20 to about 200 parts by weight of a silica filler having a surface area of at least about 150 m²/g;
   d. a polyorganohydrogensiloxane in an amount such that its Si-H groups are from about 80 to about 250 mole percent relative to the total vinyl groups contained in components (a) and (b) and which have at least three Si-H groups in each molecule; and
   e. a platinum compound.

2. The heat-curable elastomeric silicone composition of claim 1 in which the polyorganosiloxane having at least three Si-H groups in each molecule is selected from the group consisting of trialkylsilyl end-blocked polymethylhydrogensiloxane, a tetrasiloxane having the formula Si [—O—Si(CH₃)₂H]₄, a siloxane copolymer consisting of SiO₂ units and (CH₃)₂HSi—O—SiH(CH₃)₂ units, and copolymer of methylhydrogensiloxane and dialkylsiloxane.

3. The heat-curable elastomeric silicone composition of claim 1 in which the platinum compound is present in an amount from about 0.5 to about 20 ppm by weight relative to the total polysiloxane components.

4. The heat-curable elastomeric silicone composition of claim 1 in which the platinum compound is a soluble platinum compound selected from the group consisting of chloroplatinic acid and complexes of platinum chloride and olefines.

5. The heat-curable elastomeric silicone composition of claim 1 containing in addition a dispersing agent selected from the group consisting of low molecular weight siloxane esters and silanols.

6. A process for preparing vulcanizates of elastomeric silicone compositions having exceptional tear strengths comprising:
   a. heating the composition of Claim 1 at about 100° C to about 400° C for from about 30 seconds to about 1 hour; and
   b. post-curing the composition by heating at about 150° C to about 250° C for a period of from about 2 to about 24 hours.

7. The process of claim 6 wherein heating step (a) is carried out under atmospheric pressure.

8. The process of claim 6 wherein heating step (a) is carried out under superatmospheric pressure.

* * * * *